United States Patent
Chiang et al.

(10) Patent No.: US 6,860,612 B2
(45) Date of Patent: Mar. 1, 2005

(54) ILLUMINATED KEYBOARD SWITCH STRUCTURE

(75) Inventors: Chih-Hsiang Chiang, Jungli (TW); Liang-Ta Yeh, Shulin (TW)

(73) Assignee: Darfon Electronics Corp, Taoyuan (TW)

( * ) Notice: Subject to any disclaimer, the term of this patent is extended or adjusted under 35 U.S.C. 154(b) by 19 days.

(21) Appl. No.: 10/305,523

(22) Filed: Nov. 26, 2002

(65) Prior Publication Data

US 2003/0103359 A1 Jun. 5, 2003

(30) Foreign Application Priority Data

Nov. 30, 2001 (TW) ........................................ 90129698 A

(51) Int. Cl.⁷ ................................................ H01H 9/18
(52) U.S. Cl. ............................ 362/29; 362/28; 362/95; 200/314; 200/317
(58) Field of Search ............................ 362/29, 555, 23, 362/26, 28, 31, 551, 554, 95, 800; 200/314, 344, 237, 308, 310, 313, 317, 311, 341

(56) References Cited

U.S. PATENT DOCUMENTS

| | | | | |
|---|---|---|---|---|
| 4,449,024 A | * | 5/1984 | Stracener | 200/314 |
| 4,489,227 A | * | 12/1984 | Lamarche | 200/314 |
| 5,097,396 A | * | 3/1992 | Myers | 362/551 |
| 5,128,842 A | * | 7/1992 | Kenmochi | 200/314 |
| 5,521,342 A | * | 5/1996 | Bartley et al. | 362/95 |
| 5,924,553 A | * | 7/1999 | Yeh | 200/344 |
| 6,179,432 B1 | | 1/2001 | Zhang et al. | 362/84 |
| 6,199,996 B1 | | 3/2001 | Katrinecz, Jr. et al. | 362/85 |
| 6,284,988 B1 | | 9/2001 | Watanabe et al. | 200/5 A |
| 6,322,229 B1 | | 11/2001 | Chan et al. | 362/85 |
| 6,545,232 B1 | * | 4/2003 | Huo-Lu | 200/344 |
| 6,686,549 B2 | * | 2/2004 | Douzono et al. | 200/341 |

FOREIGN PATENT DOCUMENTS

| | | |
|---|---|---|
| TW | 438035 | 5/2001 |
| TW | 465777 | 11/2001 |

* cited by examiner

Primary Examiner—Sandra O'Shea
Assistant Examiner—Ismael Negron
(74) Attorney, Agent, or Firm—Ladas & Parry LLP

(57) ABSTRACT

An illuminated keyboard having a key portion, a backlight device, a light-condensing plate, a diffuser, a printed circuit board, and a light source. The key portion includes a seat and a key, and the key is disposed on the seat in a manner such that it is moved upwardly and downwardly. The backlight device is disposed beneath the key portion to illuminate the key portion. The light-condensing plate is disposed between the light guide and the key portion. The diffuser is disposed between the light guide and the key portion. The printed circuit board is disposed between the seat and the backlight device. The light source is disposed on the printed circuit board.

14 Claims, 8 Drawing Sheets

ILLUMINATED KEYBOARD SWITCH STRUCTURE

BACKGROUND OF THE INVENTION

1. Field of the Invention

The invention relates to an illuminated keyboard; in particular, an illuminated keyboard with improved illumination capability.

2. Description of the Related Art

Since computers may be used in various environments, such as dark environments, an illuminated keyboard has been provided.

FIG. 1 is a schematic view of a conventional illuminated keyboard 10 as disclosed in U.S. Pat. No. 6,284,988. The illuminated keyboard 10 comprises a key switch 11, and a backlight device 15 disposed in the key switch 11. Specifically, the key switch 11 comprises a seat 111, a printed circuit board 112, an elastic member 113a, a cap 114, and a connecting assembly 115. The printed circuit board 112 is disposed on the seat 111. The elastic member 113a is formed on the printed circuit board 112. The cap 114 corresponds to the elastic member 113a. One end of the connecting assembly 115 is connected to fixed members 111a of the seat 111 in a slideable and rotatable manner, and the other end of the connecting assembly 115 is connected to the cap 114. Thus, the cap 114 can move upward and downward relative to the seat 111. The backlight device 15 is an electroluminescent device.

In the conventional illuminated keyboard 10, since the backlight device 15 is disposed on the printed circuit board 112 of the key switch 11, the backlight device 15 is provided with a through hole 151 so that the cap 114 can connect to the seat 111 via the connecting assembly 115. For the same reason, the printed circuit board 112 is also provided with a through hole (not shown). As a result, manufacture of the conventional illuminated keyboard is complicated, and the illumination capability of the conventional illuminated keyboard is limited.

SUMMARY OF THE INVENTION

Accordingly, the invention provides an illuminated keyboard. The illuminated keyboard comprises a key portion and a backlight device. The key portion includes a seat and a key, the key is disposed on the seat in a manner such that it is moved upwardly and downwardly. The backlight device is disposed beneath the key portion to illuminate the key portion.

In a preferred embodiment, the seat includes a first through hole corresponding to the key.

Furthermore, the first through hole is filled with a transparent material.

In another preferred embodiment, the backlight device is an electroluminescent sheet.

In another preferred embodiment, the backlight device comprises a plate, a plurality of optical fibers, and a light source. The plate is disposed beneath the key portion. The light fibers are disposed on the plate. The light source is connected to the optical fibers.

In another preferred embodiment, the key portion further comprises a plastic membrane, and the plastic membrane includes an elastic member.

Furthermore, the plastic membrane is of a light-condensing material or a light-diffusing material.

In another preferred embodiment, the backlight device comprises a light guide and a light source. The light guide, including a reflective portion, is disposed beneath the key portion. The light source is disposed adjacent to the light guide.

Furthermore, the reflective portion is a reflector plate disposed beneath the light guide or a rough surface integrally formed at a bottom of the light guide or a reflective surface printed at a bottom of the light guide.

Furthermore, the illuminated keyboard further comprises a light-condensing plate and a diffuser. The light-condensing plate is disposed between the light guide and the key portion. The diffuser is disposed between the light guide and the key portion.

In another preferred embodiment, the illuminated keyboard further comprises a printed circuit board and a light source. The printed circuit board is disposed between the seat and the key. The light source is disposed on the printed circuit board.

In another preferred embodiment, the illuminated keyboard further comprises a printed circuit board and a light source. The printed circuit board is disposed between the seat and the backlight device. The light source is disposed on the printed circuit board.

Furthermore, the seat includes a second through hole, and the light source passes through the second through hole.

Furthermore, the light source is an LED.

In another preferred embodiment, the illuminated keyboard comprises a light guide, a cap, a connecting assembly, a light source, and a printed circuit board. The light guide includes a plurality of fixed members. The cap is disposed on the light guide. The connecting assembly connects the fixed members and the cap by two ends so that the cap is moved in an upward and downward manner relative to the light guide. The light source is disposed adjacent to the light guide to provide a light to the light guide and illuminate the illuminated keyboard. The printed circuit board, disposed between the light guide and the cap, is electrically coupled to the light source.

Furthermore, the light guide includes a concave portion, and the light source is disposed in the concave portion.

BRIEF DESCRIPTION OF THE DRAWINGS

The invention is hereinafter described in detail with reference to the accompanying drawings in which:

FIG. 5b is a cross section along line A—A in FIG. 5a;

DETAILED DESCRIPTION OF THE INVENTION

Figure 1:
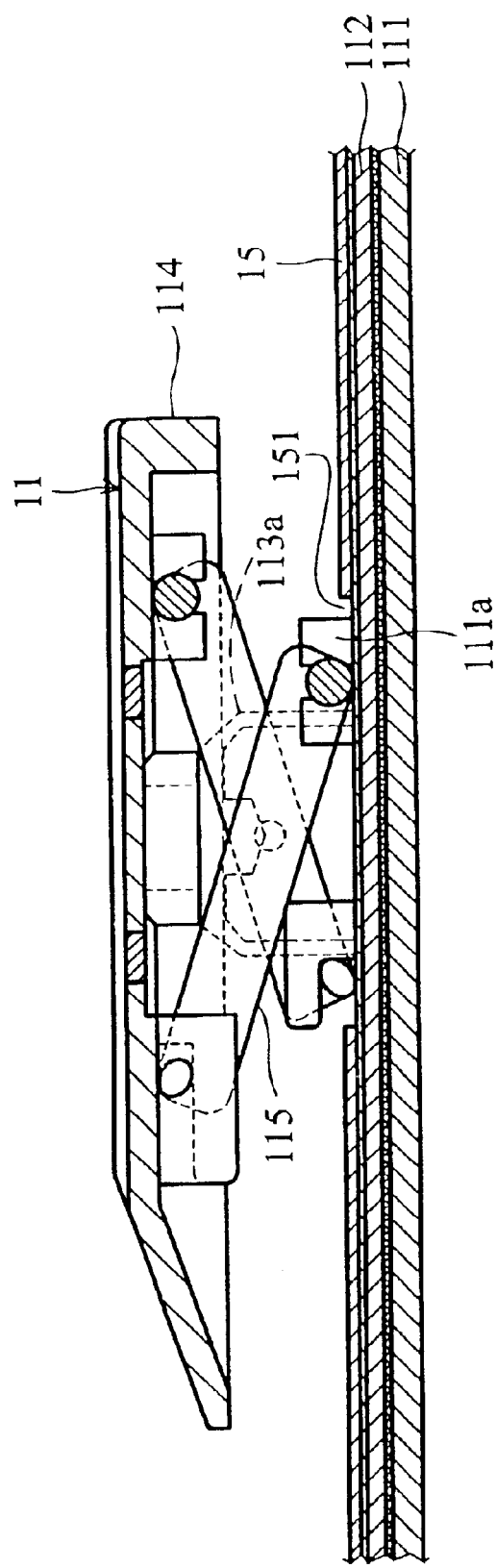
FIG. 1 is a schematic view of a conventional illuminated keyboard.
Figure 2:
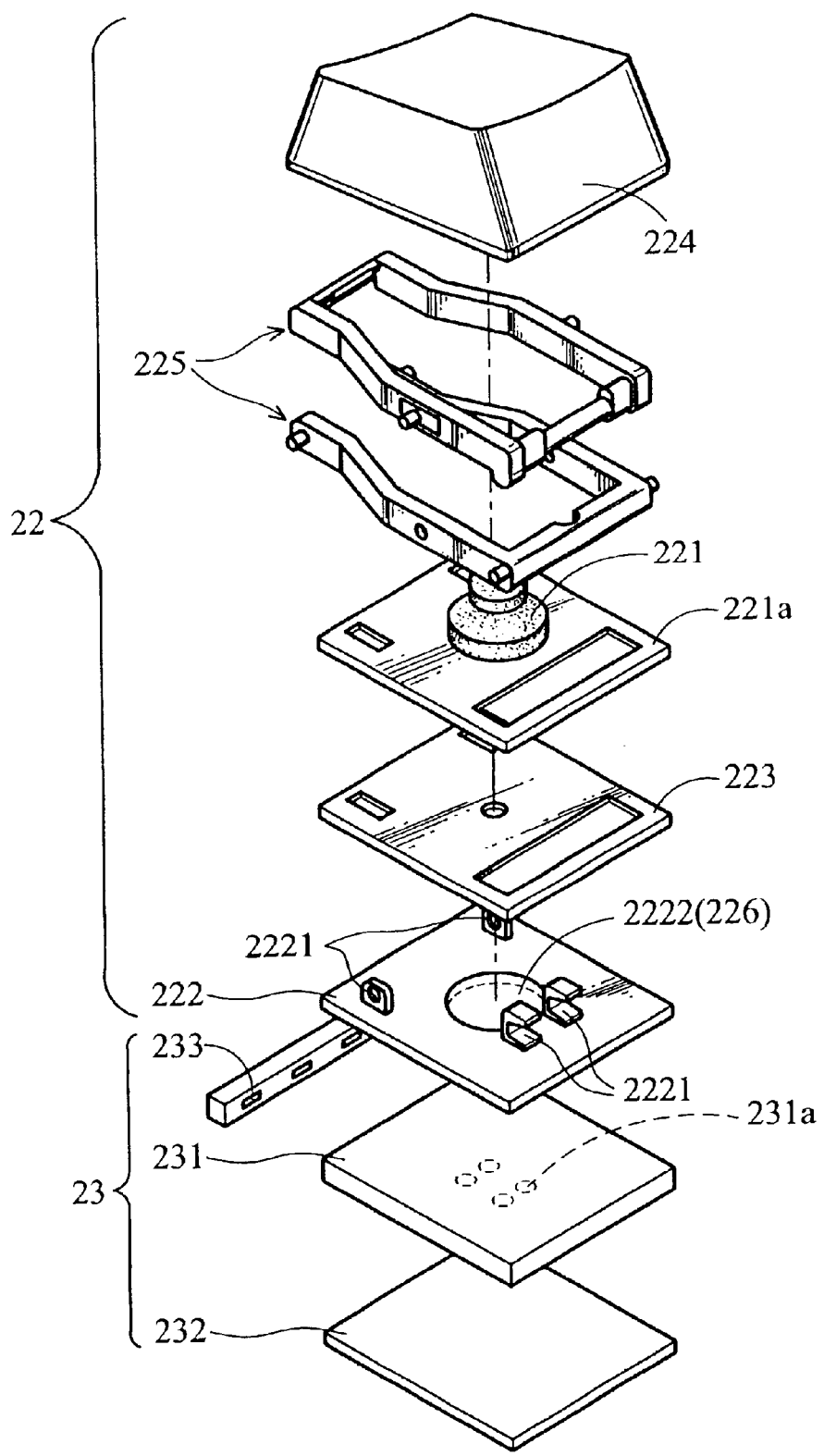
FIG. 2 is a schematic view of an illuminated keyboard as disclosed in this invention.

FIG. 2 is a schematic view of an illuminated keyboard 20 as disclosed in this invention. As shown in FIG. 2, the illuminated keyboard 20 comprises a key portion 22 and a backlight device 23. It is noted that the illuminated keyboard 20 further comprises a housing, a cover, and other elements of a conventional keyboard. However, for simplicity, such elements are omitted.

Figure 3:
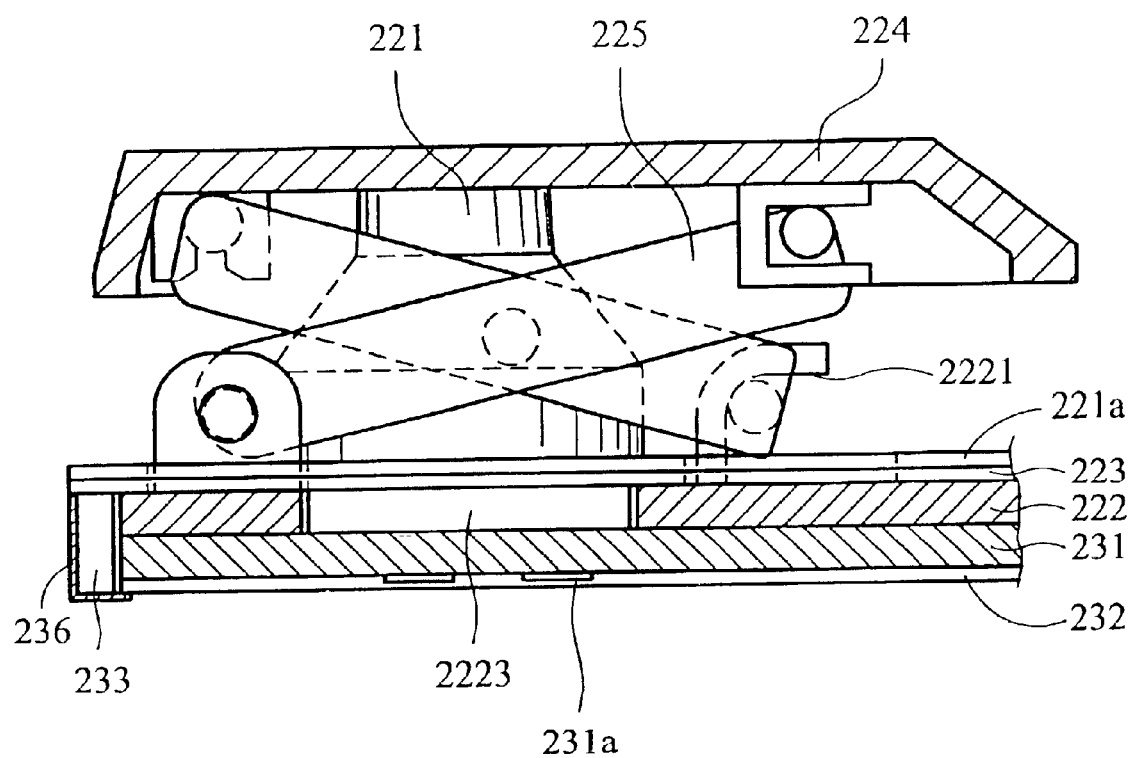
FIG. 3 is a cross section of the assembled illuminated keyboard in FIG. 2.

The key portion 22 is disposed on the housing (not shown) of the illuminated keyboard 20, and comprise a seat 222, a membrane circuit board 223, a cap 224, an elastic member 221, and a connecting assembly 225. Referring to FIG. 3, the seat 222 is provided with a plurality of fixed members 2221. One end of the connecting assembly 225 is connected to fixed members 2221 of the seat 222 in a slideable and rotatable manner, and the other end of the connecting assembly 225 is connected to the cap 224. Thus, the cap 224 can move upward and downward relative to the seat 222. The elastic member 221 is disposed between the membrane circuit board 223 and the cap 224 to support the cap 224.

The seat 222 includes a first through hole 2222 corresponding to the elastic member 221. It is understood that the first through hole 2222 can be filled with an intermediate layer 226 of transparent material.

The membrane circuit board 223 may be transparent plastic, such as PE (polyester). In addition, the elastic member 221 may be formed on Mylar 221a to increase convenience of assembly of the keyboard 20, or the elastic member 221 may be directly mounted on the membrane circuit board 223. If there is no intermediate layer 226 in the first through hole 2222, the thickness of the membrane circuit board 223 increases.

Referring to FIG. 2, the backlight device 23 is disposed beneath the key portion 22 to illuminate the key portion 22 from the bottom of the key portion 22. The backlight device 23 comprises a light guide 231, a reflector plate 232 and a light source 233.

As shown in FIG. 2, the light guide 231 includes a plurality of reflective portions 231a at the bottom surface, and is disposed beneath the seat 222 of the key portion 22. The reflective portions 231a are located under the intermediate layer 226, and reflect a light, emitted from the light source 233, to the key portion 22 to enhance illumination capability. The reflective portions 231a may be printed at the bottom surface of the light guide 231, or are integrally formed on a rough surface at the bottom of the light guide 231. It is noted that the area of the reflective portions 231a becomes smaller when they are near the light source 233, and larger when they are far away from the light source 233.

In addition, the light guide 231 may be integrally formed with seat 222 to reduce the thickness of the whole keyboard 20. Specifically, the seat 222 of the key portion 22 is of light-guiding material, and the fixed members 2221 are formed on the seat 222 by injection molding. For example, the light-guiding material may be Acrylic, or polycarbonate (PC), or ABS.

Figure 4A:
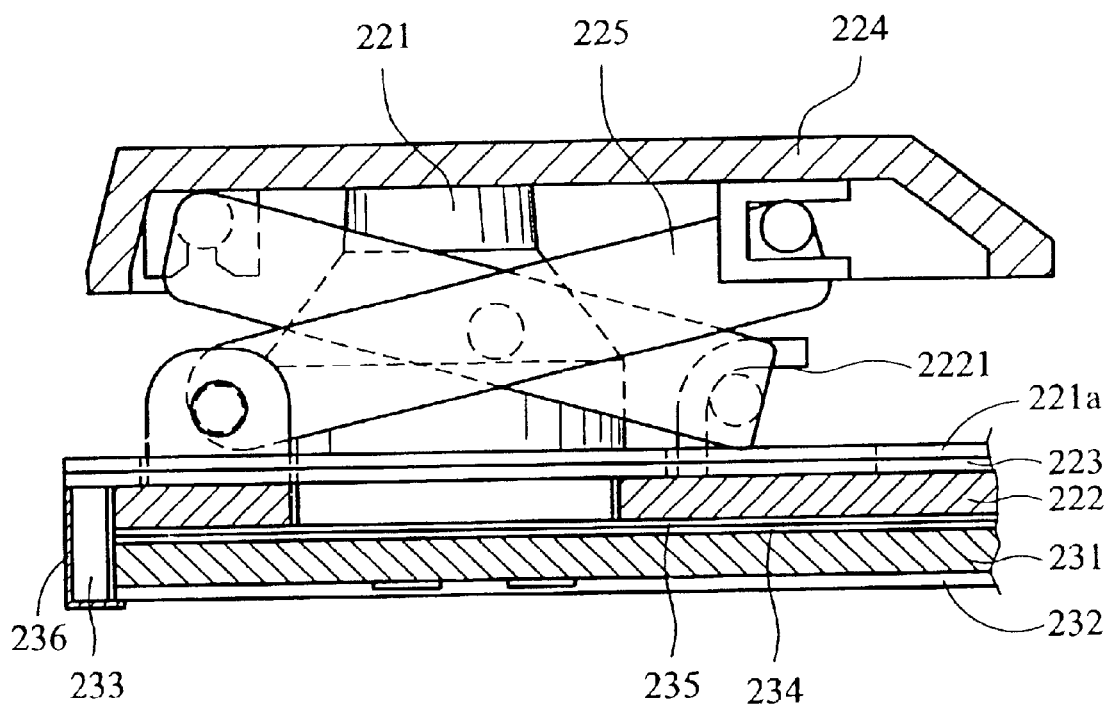
FIG. 4a is a cross section of the assembled illuminated keyboard, wherein a backlight device is a variant embodiment.

Referring to FIG. 4a, the illuminated keyboard 20 may further comprise a light-condensing plate 234 and a diffuser 235. The light-condensing plate 234 is disposed between the light guide 231 and the key portion 22. The diffuser is also disposed between the light guide 231 and the key portion 22. The light-condensing plate 234 may be PC membrane, and the diffuser 235 may be PET membrane.

Figure 4B:
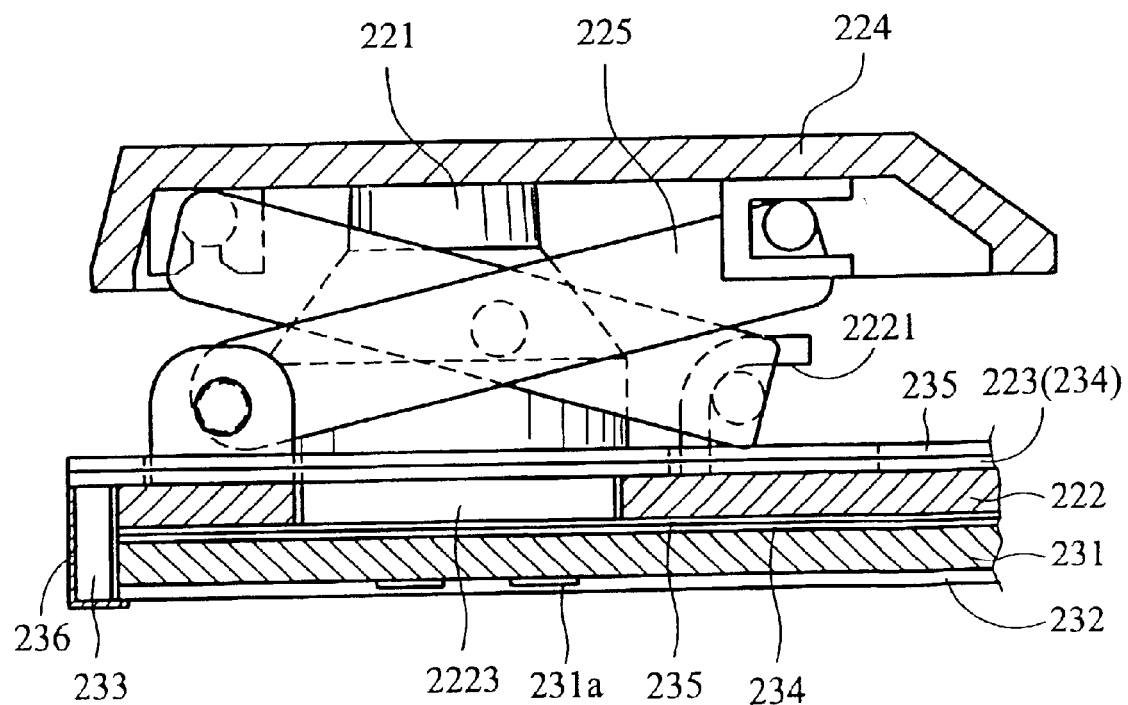
FIG. 4b is a cross section of the assembled illuminated keyboard, wherein a backlight device is another variant embodiment.

For reducing the thickness of the whole keyboard 20, the elastic member 221 may be connected to the diffuser 235, the diffuser 235 disposed between the light guide 231 and the cap 224, and the light-condensing plate 234 may be integrally formed with the membrane circuit board 223, as shown in FIG. 4b. In addition, the elastic member 221 may be transparent rubber, connected to the diffuser 235 to attain the light-diffusing effect.

It is understood that the elastic member may be formed on the light-condensing plate to remove the diffuser, or the membrane circuit board may be integrally formed with the diffuser to remove the light-condensing plate.

Figure 5B:
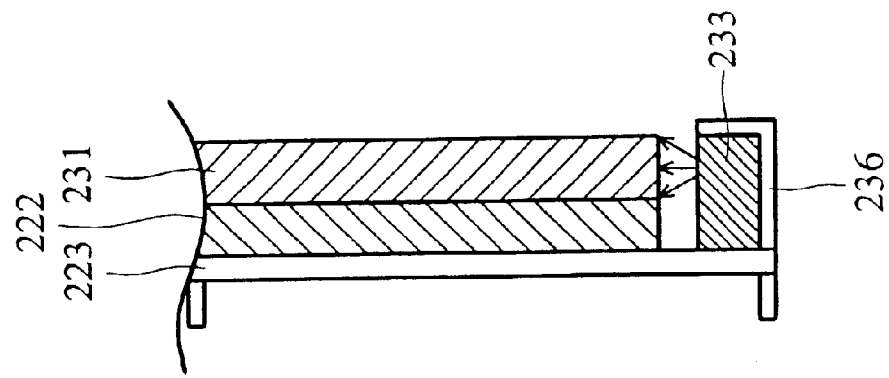
Figure 5A:
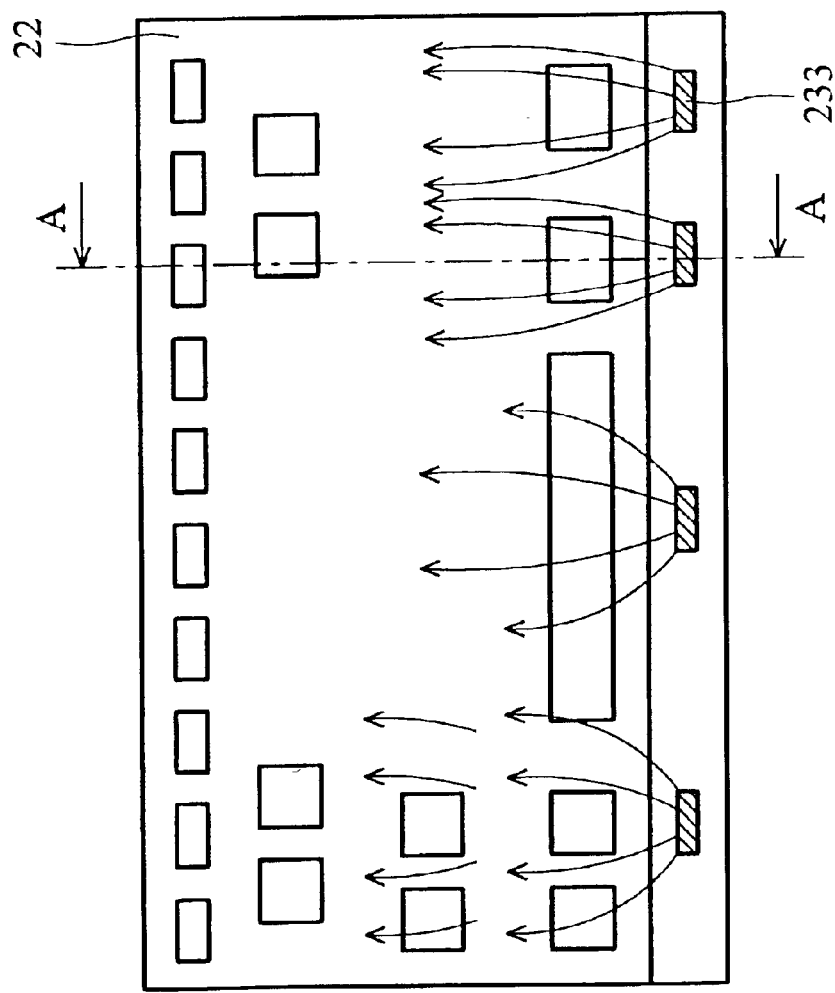
FIG. 5a is a schematic view of the assembled illuminated keyboard in FIG. 2.

Referring to FIG. 3, FIG. 5a, and FIG. 5b, the light source 233 is disposed on the membrane circuit board 223 in a manner such that it is located adjacent to the light guide 231. A shielding member 236 is disposed adjacent to the light source 233 so that the light, emitted from the light source 233, can be fully directed to the light guide 231. In addition, the light source 233 can be disposed on the membrane circuit board 223 via the shielding member 236 so that no additional mounting member for the light source 233 is required.

Figure 5D:
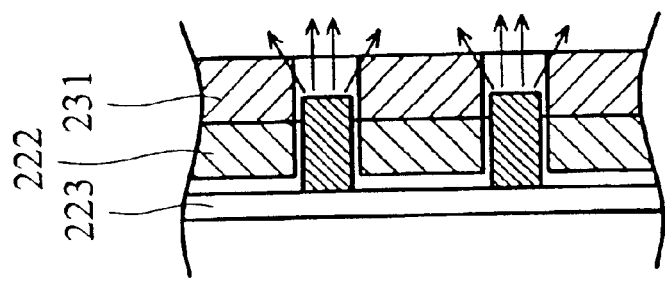
FIG. 5d is a cross section along line B—B in FIG. 5c.
Figure 5C:
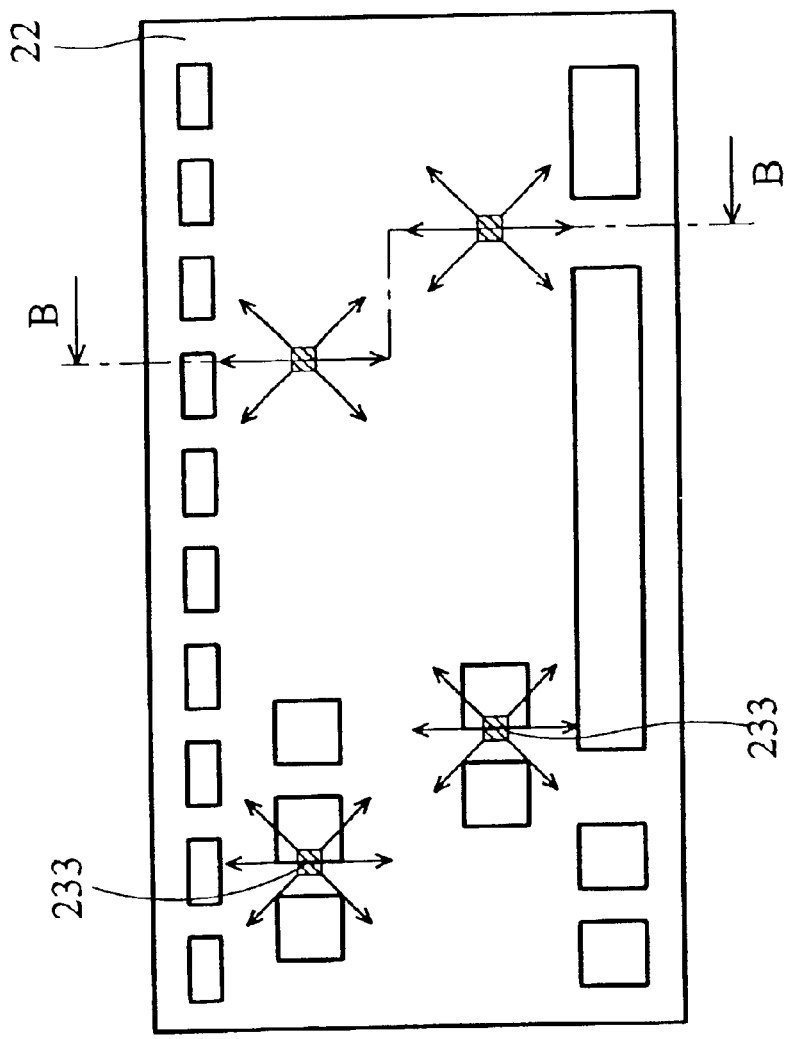
FIG. 5c is a schematic view of a variant embodiment of an illuminated keyboard as disclosed in this invention, wherein a light source is a variant embodiment.
Figure 5E:
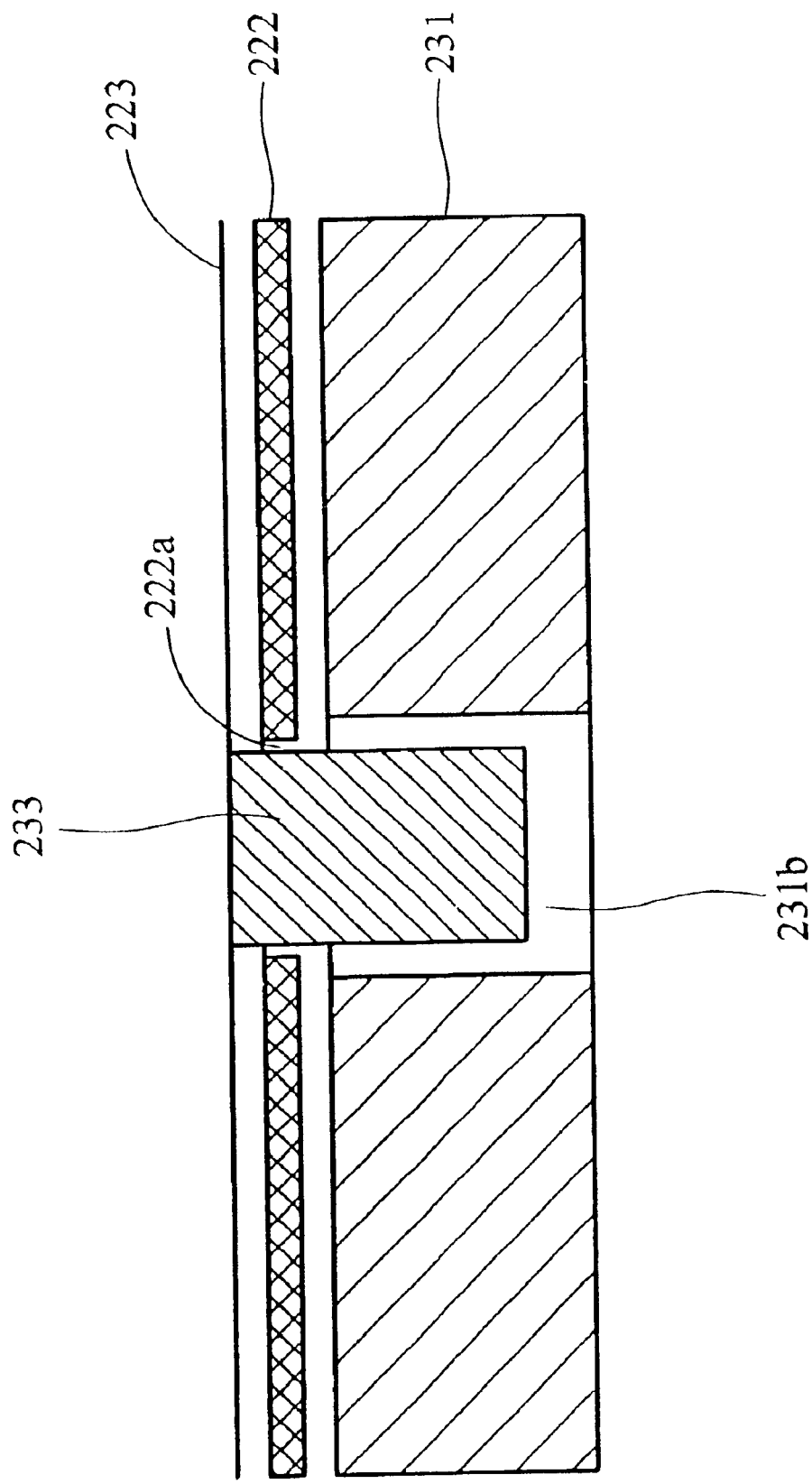
FIG. 5e is a partial enlarged view in FIG. 5d.

Referring to FIG. 5c, FIG. 5d, and FIG. 5e, the light guide 231 may be provided with a plurality of concave portions 231b, and the seat 222 is provided with a plurality of second through holes 222a corresponding to the concave portions 231b. Thus, the light source 233 is disposed beneath the membrane circuit board 223, and it located in the concave portion 231b through the second through hole 222a. As a result, the illumination capability of the illuminated keyboard 20 can be enhanced.

It is understood that the light source 233 may be an LED.

Referring to FIG. 2, the reflector plate 232 is disposed beneath the light guide 231 to reflect the light, emitted from the light source 233, to the key portion 22. It is understood that the reflector plate 232 can be removed if the light guide 231 is provided with the reflective portions 231a at the bottom surface as stated above.

Figure 6:
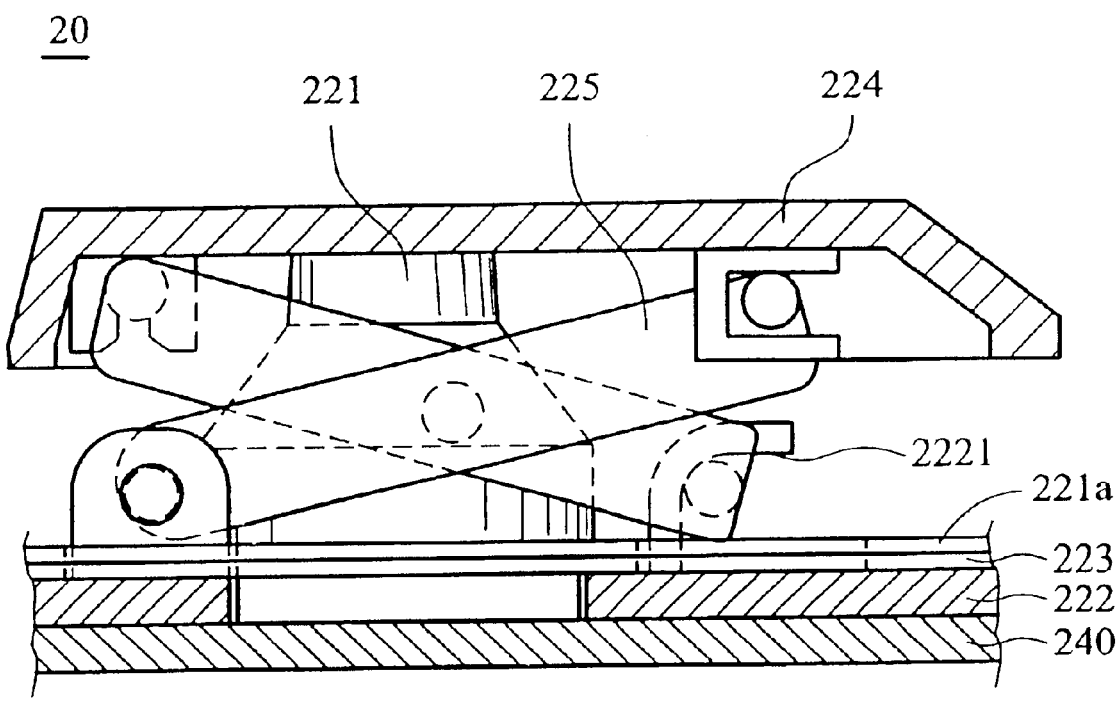
FIG. 6 is a schematic view of another variant embodiment of an illuminated keyboard as disclosed in this invention.

FIG. 6 is a schematic view of a variant embodiment of an illuminated keyboard as disclosed in this invention. In this embodiment, the backlight device is an electroluminescent sheet (EL sheet) 240. The EL sheet 240 is electrically coupled to the membrane circuit board 223 or a power source (not shown) of the keyboard 20.

Figure 7:
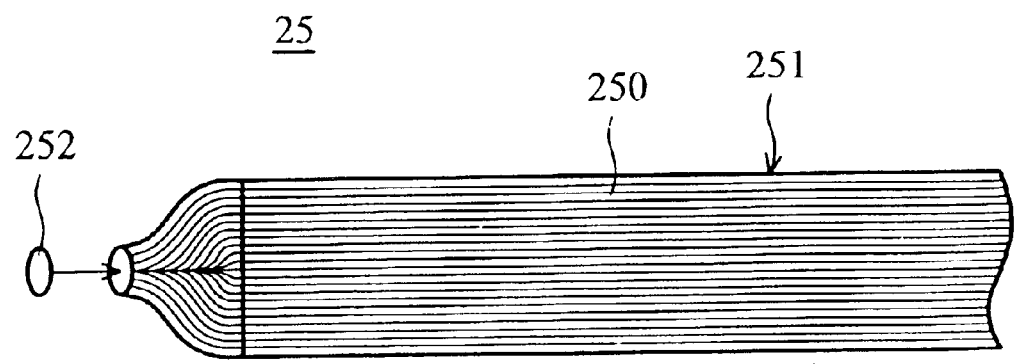
FIG. 7 is a schematic view that shows another variant embodiment of the backlight device.

FIG. 7 is a schematic view of another variant embodiment of an illuminated keyboard as disclosed in this invention. In this embodiment, the backlight device 25 comprises a plate 251, a plurality of optical fibers 250, and a light source 252. The plate 251 is disposed beneath the key portion 22. The light fibers 250 are disposed on the plate 251. The light source 252 is electrically coupled to a power source (not shown) of the keyboard 20, and is located adjacent to the optical fibers 250 to illuminate the keyboard 20.

Alternatively, the membrane circuit board 223 may be disposed beneath the seat 222, with the elastic member 221 disposed on the membrane circuit board 223 and passing through the seat 222 to support the cap 224. Furthermore, the elastic member 221 may be disposed on the seat 222 so that the elastic member 221 is in contact with a switch (not shown) on the membrane circuit board 223 to generate a corresponding signal when the cap 224 is pressed down.

The advantages of the illuminated keyboard 20 are described as follows.

1. Since the backlight device is disposed beneath the key portion, the light guide is not provided with a through hole like the printed circuit board. Thus, manufacture is simplified, and the illumination capability is improved.

2. Since the light source is disposed on the membrane circuit board, it is not necessary to add members for mounting the light source. In addition, since the light source can be located in the concave portion of the light guide, the illumination capability of the keyboard can be enhanced.

3. The seat may be light-guiding material, the elastic member may be connected to the diffuser or the light-condensing plate, and the membrane circuit board may be light-condensing material; therefore, the thickness of the whole illuminated keyboard can be decreased.

4. Since the seat is provided with through holes corresponding to the elastic members, the weight of the whole illuminated keyboard can be reduced.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. An illuminated keyboard comprising:
   a key switch including a seat, a membrane circuit board, a connecting assembly, and a cap, wherein the seat includes a through hole corresponding to the cap, the membrane circuit board is disposed between the seat and the cap, the cap is disposed on the seat by the connecting assembly in a manner such that the cap is moved upwardly and downwardly relative to the seat; and
   a backlight device disposed beneath the seat of the key switch to illuminate the key switch via the through hole.

2. The illuminated keyboard as claimed in claim 1, wherein the first through hole is filled with a transparent material.

3. The illuminated keyboard as claimed in claim 1, wherein the backlight device is an electroluminescent sheet.

4. The illuminated keyboard as claimed in claim 1, wherein the backlight device comprises:
   a plate disposed beneath the key switch;
   a plurality of optical fibers disposed on the plate; and
   a light source disposed adjacent to the optical fibers.

5. The illuminated keyboard as claimed in claim 1, wherein the membrane circuit board includes an elastic member.

6. The illuminated keyboard as claimed in claim 1, wherein the membrane circuit board comprises light-condensing material.

7. The illuminated keyboard as claimed in claim 1, wherein the membrane circuit board comprises light-diffusing material.

8. The illuminated keyboard as claimed in claim 1, wherein the key switch further comprises:
   a light source disposed on the membrane circuit board.

9. The illuminated keyboard as claimed in claim 1, wherein the backlight device comprises:
   a light guide, including a reflective portion, disposed beneath the key switch; and
   a light source disposed adjacent to the light guide.

10. The illuminated keyboard as claimed in claim 9, wherein the reflective portion is a reflector plate disposed beneath the light guide.

11. The illuminated keyboard as claimed in claim 9, wherein the reflective portion is a rough surface integrally formed at a bottom of the light guide.

12. The illuminated keyboard as claimed in claim 9, wherein the reflective portion is a reflective surface printed at a bottom of the light guide.

13. The illuminated keyboard as claimed in claim 9, further comprising:
   a light-condensing plate disposed between the light guide and the key switch.

14. The illuminated keyboard as claimed in claim 9, further comprising:
   a diffuser disposed between the light guide and the key switch.

* * * * *

(12) EX PARTE REEXAMINATION CERTIFICATE (10330th)

United States Patent
Chiang et al.

(10) Number: US 6,860,612 C1
(45) Certificate Issued: Oct. 15, 2014

(54) ILLUMINATED KEYBOARD SWITCH STRUCTURE

(75) Inventors: Chih-Hsiang Chiang, Jungli (TW); Liang-Ta Yeh, Shulin (TW)

(73) Assignee: Darfon Electronics Corp.

Reexamination Request:
No. 90/012,544, Oct. 26, 2012

Reexamination Certificate for:
Patent No.: 6,860,612
Issued: Mar. 1, 2005
Appl. No.: 10/305,523
Filed: Nov. 26, 2002

(30) Foreign Application Priority Data

Nov. 30, 2001 (TW) .............................. 90129698 A

(51) Int. Cl.
*F21V 8/00* (2006.01)
*H01H 3/12* (2006.01)

(52) U.S. Cl.
USPC .......... 362/23.05; 200/314; 200/317; 362/95; 362/23.03

(58) Field of Classification Search
None
See application file for complete search history.

(56) References Cited

To view the complete listing of prior art documents cited during the proceeding for Reexamination Control Number 90/012,544, please refer to the USPTO's public Patent Application Information Retrieval (PAIR) system under the Display References tab.

*Primary Examiner* — Margaret Rubin

(57) ABSTRACT

An illuminated keyboard having a key portion, a backlight device, a light-condensing plate, a diffuser, a printed circuit board, and a light source. The key portion includes a seat and a key, and the key is disposed on the seat in a manner such that it is moved upwardly and downwardly. The backlight device is disposed beneath the key portion to illuminate the key portion. The light-condensing plate is disposed between the light guide and the key portion. The diffuser is disposed between the light guide and the key portion. The printed circuit board is disposed between the seat and the backlight device. The light source is disposed on the printed circuit board.

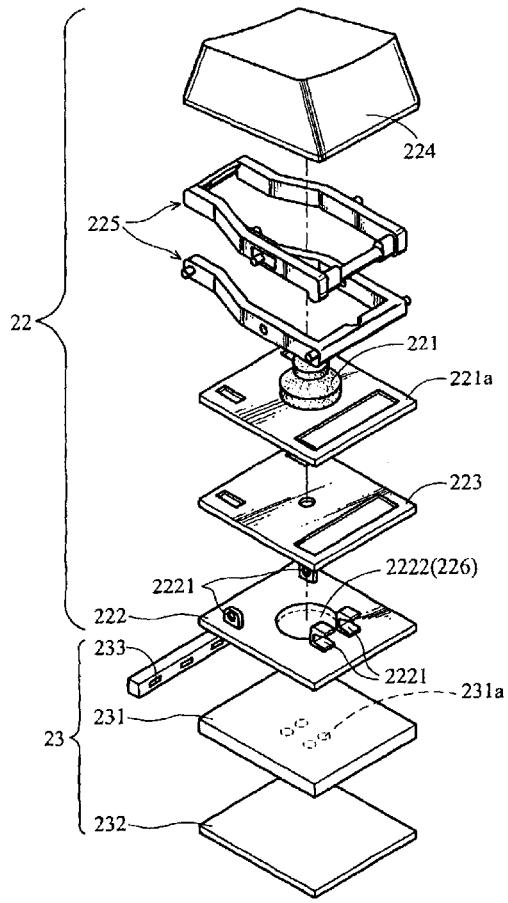

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 3 and 4 are cancelled.

Claims 1, 6 and 8-12 are determined to be patentable as amended.

Claims 5, 7 and 14, dependent on an amended claim, are determined to be patentable.

New claims 15-37 are added and determined to be patentable.

Claims 2 and 13 were not reexamined.

1. An illuminated keyboard comprising:
a key switch including a seat, *a fixed member,* a membrane circuit board, a connecting assembly, and a cap, wherein the seat includes a through hole corresponding to the cap, *the fixed member is positioned directly on the seat and connected to the connecting assembly,* the membrane circuit board is disposed between the seat and the cap, the cap is disposed on the seat by the connecting assembly in a manner such that the cap is moved upwardly and downwardly relative to the seat; and
a backlight device disposed beneath the seat of the key switch to illuminate the key switch via the through hole, *wherein a plurality of reflective portions are disposed underneath the cap and spaced apart from each other on the same plane.*

6. [The illuminated keyboard as claimed in claim 1] *An illuminated keyboard comprising:*
*a key switch including a seat, a membrane circuit board, a connecting assembly, and a cap, wherein the seat includes a through hole corresponding to the cap, the membrane circuit board is disposed between the seat and the cap, the cap is disposed on the seat by the connecting assembly in a manner such that the cap is moved upwardly and downwardly relative to the seat; and*
*a backlight device disposed beneath the seat of the key switch to illuminate the key switch via the through hole,* wherein the membrane circuit board comprises light-condensing material.

8. [The illuminated keyboard as claimed in claim 1] *An illuminated keyboard comprising:*
*a key switch including a seat, a membrane circuit board, a connecting assembly, and a cap, wherein the seat includes a through hole corresponding to the cap, the membrane circuit board is disposed between the seat and the cap, the cap is disposed on the seat by the connecting assembly in a manner such that the cap is moved upwardly and downwardly relative to the seat; and*
*a backlight device disposed beneath the seat of the key switch to illuminate the key switch via the through hole,* wherein the key switch further comprises: a light source disposed on the membrane circuit board.

9. The illuminated keyboard as claimed in claim 1, wherein the backlight device comprises:
a light guide, including [a] *the plurality of* reflective [portion] *portions*, disposed beneath the key switch; and
a light source disposed adjacent to the light guide.

10. The illuminated keyboard as claimed in claim 9, wherein [the reflective portion is] a reflector plate *is* disposed beneath the light guide.

11. The illuminated keyboard as claimed in claim 9, wherein the *plurality of* reflective [portion is a rough surface] *portions are* integrally formed at a bottom of the light guide.

12. The illuminated keyboard as claimed in claim 9, wherein the *plurality of* reflective [portion is a reflective surface] *portions are* printed at a bottom of the light guide.

*15. The illuminated keyboard as claimed in claim 1, wherein the backlight device comprises:*
*a light guide, wherein each of the plurality of reflective portions is a reflective surface printed on a bottom surface of the light guide.*

*16. An illuminated keyboard comprising:*
*a key switch including a seat, a membrane circuit board, a connecting assembly, and a cap, wherein the seat includes a through hole corresponding to the cap, the membrane circuit board is disposed between the seat and the cap, the cap is disposed on the seat by the connecting assembly in a manner such that the cap is moved upwardly and downwardly relative to the seat;*
*a backlight device disposed beneath the seat of the key switch to illuminate the key switch via the through hole; and*
*a plurality of reflective portions are disposed underneath the key switch, wherein the backlight device comprises a light guide that includes the plurality of reflective portions, and each of the plurality of reflective portions is protruded downward from the bottom surface of the light guide.*

*17. The illuminated keyboard as claimed in claim 1, wherein the plurality of reflective portions are in the form of dots.*

*18. The illuminated keyboard as claimed in claim 17, wherein the backlight device comprises:*
*a light guide, wherein each of the plurality of reflective portions is a reflective surface printed on a bottom surface of the light guide.*

*19. An illuminated keyboard comprising:*
*a key switch including a seat, a membrane circuit board, a connecting assembly, and a cap, wherein the seat includes a through hole corresponding to the cap, the membrane circuit board is disposed between the seat and the cap, the cap is disposed on the seat by the connecting assembly in a manner such that the cap is moved upwardly and downwardly relative to the seat; and*
*a backlight device disposed beneath the seat of the key switch to illuminate the key switch via the through hole, wherein a plurality of reflective portions are disposed underneath the through hole corresponding to the cap, and the backlight device comprises a light guide that includes the plurality of reflective portions, and each of the plurality of reflective portions is protruded downward from the bottom surface of the light guide.*

*20. An illuminated keyboard comprising:*
*a key switch including a seat, a membrane circuit hoard, a connecting assembly, and a cap, wherein the seat includes a through hole corresponding to the cap, the* membrane circuit board is disposed between the seat and the cap, the cap is disposed on the seat by the connecting assembly in a manner such that the cap is moved upwardly and downwardly relative to the seat; and a backlight device disposed beneath the seat of the key switch to illuminate the key switch via the through hole, wherein the seat comprises light-guiding material.

21. An illuminated keyboard comprising:

a key switch including a seat, a first pair and a second pair of fixed members, a membrane circuit board, a connecting assembly, and a cap, wherein the seat includes a through hole corresponding to the cap, the first pair and the second pair of fixed members are positioned directly on the seat, the membrane circuit board is disposed between the seat and the cap, the cap is disposed on the seat by the connecting assembly in a manner such that the cap is moved upwardly and downwardly relative to the seat; and a backlight device disposed beneath the seat of the key switch to illuminate the key switch via the through hole, wherein the connecting assembly is connected to the first pair and second pair of fixed members, and a plurality of reflective portions are disposed between the first pair and the second pair of fixed members and spaced apart from each other on the same plane.

22. The illuminated keyboard as claimed in claim 21, wherein the plurality of reflective portions are in the form of dots.

23. The illuminated keyboard as claimed in claim 16, wherein the backlight device comprises a diffuser disposed between the light guide and the key switch.

24. The illuminated keyboard as claimed in claim 16, wherein each of the plurality of reflective portions is a reflective surface printed on a bottom surface of the light guide.

25. The illuminated keyboard as claimed in claim 19, wherein the backlight device comprises a diffuser disposed between the light guide and the key switch.

26. The illuminated keyboard as claimed in claim 19, wherein each of the plurality of reflective portions is a reflective surface printed on a bottom surface of the light guide.

27. The illuminated keyboard as claimed in claim 16, wherein the plurality of reflective portions are integrally formed at the bottom of the light guide.

28. The illuminated keyboard as claimed in claim 19, wherein the plurality of reflective portions are integrally formed at the bottom of the light guide.

29. An illuminated keyboard comprising:

a key switch including a seat, a fixed member, a membrane circuit board, a connecting assembly, and a cap, wherein the seat includes a through hole corresponding to the cap, the fixed member is positioned directly on the seat and connected to the connecting assembly, the membrane circuit board is disposed between the seat and the cap, the cap is disposed on the seat by the connecting assembly in a manner such that the cap is moved upwardly and downwardly relative to the seat;

an elastic member disposed above the membrane circuit board and overlaps with the through hole in the seat of the key switch; and a backlight device disposed beneath the seat of the key switch to illuminate the key switch via the through hole.

30. The illuminated keyboard as claimed in claim 29, wherein the backlight device is an electroluminescent sheet.

31. The illuminated keyboard as claimed in claim 29, wherein the backlight device comprises:

a plate disposed beneath the key switch;

a plurality of optical fibers disposed on the plate; and a light source disposed adjacent to the optical fibers.

32. The illuminated keyboard as claimed in claim 29, wherein the backlight device comprises a light guide disposed beneath the seat of the key switch, wherein the light guide includes a plurality of reflective portions disposed underneath the cap and spaced apart from each other at a surface of the light guide.

33. The illuminated keyboard as claimed in claim 32, wherein the plurality of reflective portions are printed at the bottom surface of the light guide.

34. The illuminated keyboard as claimed in claim 32, wherein the plurality of reflective portions are integrally formed at the bottom of the light guide.

35. The illuminated keyboard as claimed in claim 32, wherein the plurality of reflective portions are in the form of dots.

36. The illuminated keyboard as claimed in claim 32, wherein the bottom of the light guide has a rough surface.

37. The illuminated keyboard as claimed in claim 32, wherein each of the plurality of reflective portions is protruded downward from a bottom surface of the light guide.

* * * * *